ISAAC E. GIDDINGS'
"Stuffing Box."
No. 123,097.    Patented Jan. 30, 1872.
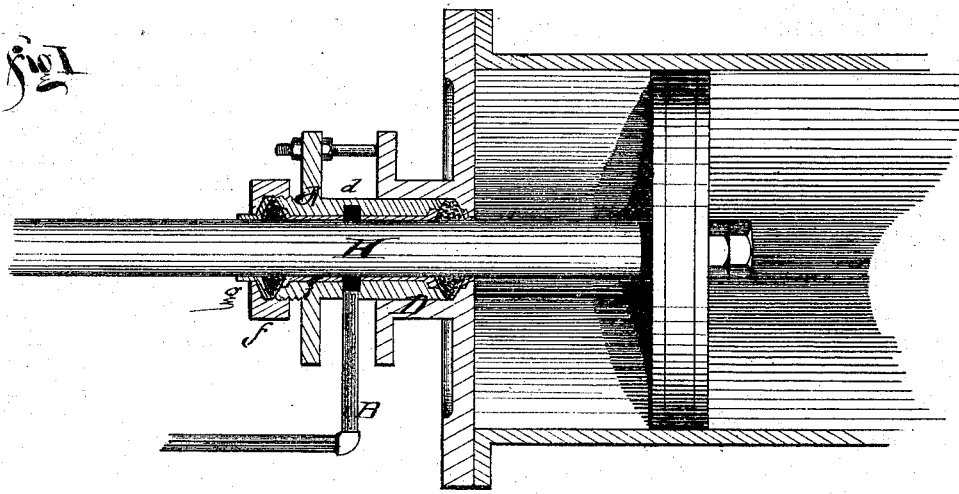
Fig. I.
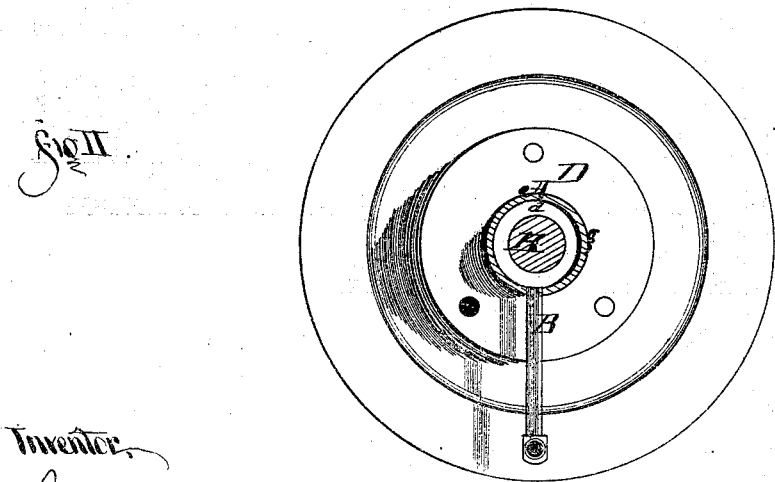
Fig. II.
Inventor
Isaac E. Giddings
by his attorneys
Gardiner & Hyde
Witnesses
H. S. Miller
Jas. D. Patten

UNITED STATES PATENT OFFICE.

ISAAC E. GIDDINGS, OF SPRINGFIELD, MASSACHUSETTS.

IMPROVEMENT IN STUFFING-BOXES.

Specification forming part of Letters Patent No. 123,097, dated January 30, 1872; antedated January 25, 1872.

SPECIFICATION.

I, ISAAC E. GIDDINGS, of Springfield, Hampden county, Commonwealth of Massachusetts, have made certain Improvements in "Stuffing-Boxes," of which the following is a specification:

My invention relates to the construction of the gland of a stuffing-box; and it consists in forming within it a groove, which shall surround the piston-rod or pump-plunger, and be of sufficient depth to receive any water escaping from the steam or water cylinder around the piston-rod or plunger until it can be carried off by a pipe passing through the gland from the outside, and connected directly with the groove; and in constructing, in connection with the groove and its pipe, a box within the outer end of the gland, in which the packing is held and compressed by a nut and follower; the object of my invention being to prevent all escape of water or other liquids from the outer end of the stuffing-box over the ports of the engine or pump beneath, and to insure, by the water or liquid within the gland and packing, a constant lubrication of the rod, while enabling a steam-tight stuffing-box to be made when used for steam without the necessity of compressing the packing around the rod so tightly that the rod or plunger is in danger of being heated or cut or the packing charred. An important object is gained, also, in this stuffing-box in the necessity being obviated of frequently compressing and renewing the packing, as in those in ordinary use, as in mine the packing is kept elastic, and cannot cake, shrink, or burn, and the stuffing-box, when the gland is secured in place, requires no frequent attention.

In the drawing, Figure I is a side sectional view of the box and gland. Fig. II is a cross-sectional view of the gland at the groove.

A is the gland received into the box D and held in place by bolts through their respective flanges. $d$ is the groove within the gland and encircling the piston-rod H. B is the pipe communicating from the groove $d$ and conveying the escape water or liquids clear of the engine or pump. This pipe I prefer to have enter the gland beneath it, though it could join the groove at any point without having any effect upon the escape of water therefrom, and may be varied as more or less liquid is required to remain in the groove. $g$ is the box, with the nut $f$, for preventing any liquid from following the rod without the gland; but as the liquid within the gland has a means of escape provided for it against no resistance in the pipe B, a very slight compression of the packing in the box $g$ serves to cut off all escape in its direction.

Now, having described my invention, what I claim is—

The arrangement of the gland A of a stuffing-box, having the groove $d$, with pipe B leading therefrom, and lining $g\ g'$, with its nut $f$, the parts being constructed substantially in the manner as shown and described.

ISAAC E. GIDDINGS.

Witnesses:
J. M. STEBBINS,
E. V. SMITH.